Patented July 21, 1936

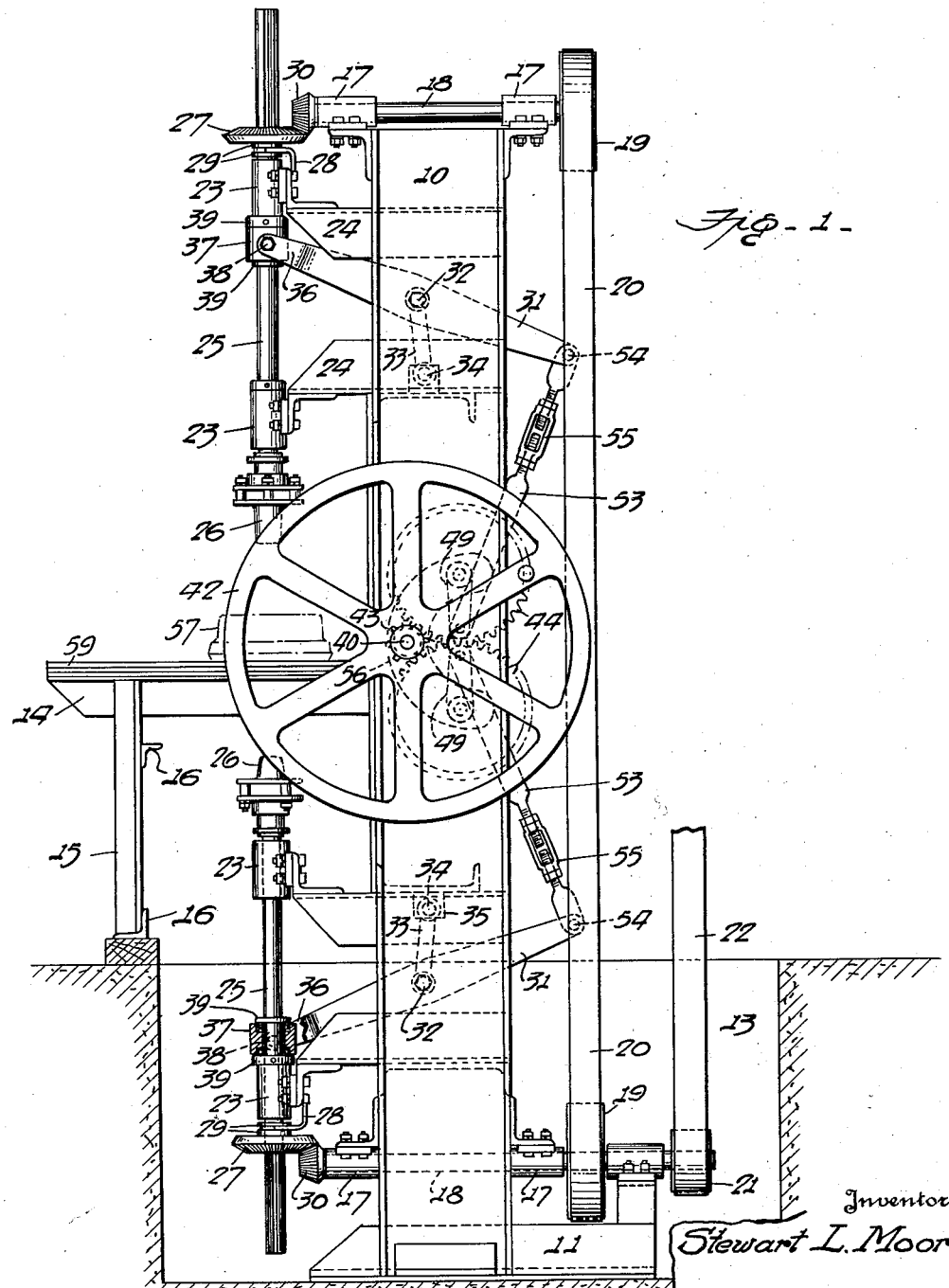

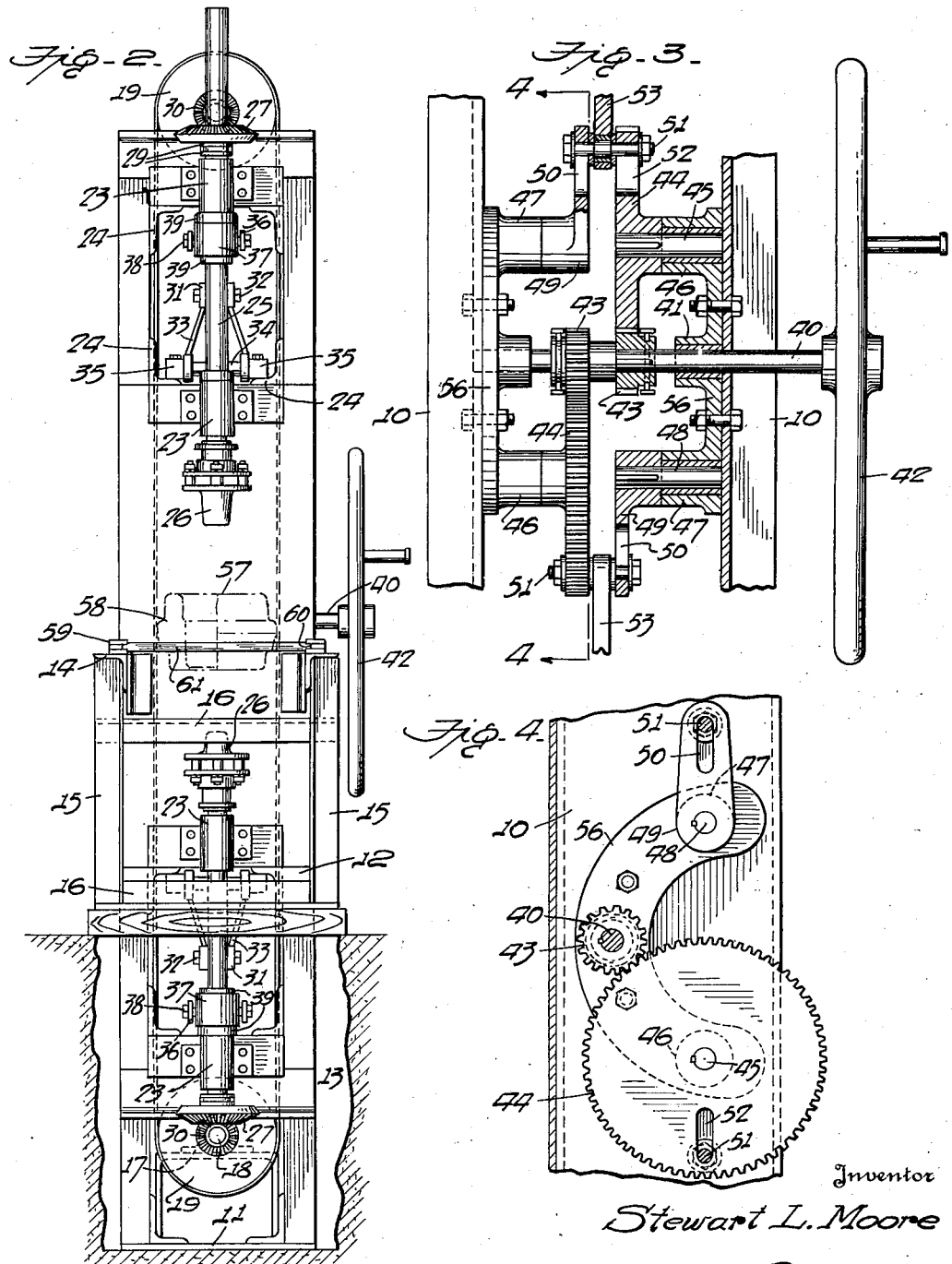

2,048,558

UNITED STATES PATENT OFFICE 2,048,558

INSULATOR PLUNGING MACHINE

Stewart L. Moore, Baltimore, Md., assignor to Locke Insulator Corporation, Baltimore, Md., a corporation of Maryland Application November 16, 1932, Serial No. 642,946

5 Claims. (Cl. 25—3)

The invention relates to machines for working upon and shaping objects while in a plastic condition and has special reference to a machine for recessing porcelain insulators while in a plastic condition, though the use is not necessarily limited to this purpose.

In the manufacture of porcelain insulators it is well known that in certain types there are recesses provided, for one purpose or another, in opposite sides, possibly for the reception or accommodation of metallic fittings or for some other reason. Notably in the bus bar diaphragm bushing type the porcelain piece is formed with recesses at opposite sides separated by a relatively thin wall or diaphragm. In other varieties pins or their equivalent for suspension or other purposes or for the mounting of elements may be cemented in such recesses. Ordinarily it is a common practice to plunge a recess in one side and then cut out or bore one in the other side, a method which is disadvantageous on account of involving separate steps, that is to say distinct and separate operations which are not carried out in the same machine.

It is with the above facts in view that I have devised the present invention which has for its general object the provision of a novel machine by means of which recesses may be plunged, in contradistinction to cutting, in opposite sides of a plastic or "green" procelain or other equivalent piece or object at the same time and by a single operation.

Generally considered, my invention contemplates the provision of a suitable transmission mechanism for moving a pair of plungers toward each other, or away from each other as the case may be, while they are rotating and are arranged in axial alinement.

An important object of the invention is to provide a machine of this character embodying a novel mechanism which is manually controlled and which is for the purpose of imparting the desired and in fact necessary reciprocatory movement to the plunger carrying spindles.

Another object is to provide means for adjusting the "throw" or in other words the extent of movement of the plungers toward or from each other, this being dependent upon the thickness of the piece to be worked upon and the contemplated thickness of the diaphragm or wall to be left between the opposed recesses.

A further object is to provide a machine of this character which may be operated without any necessity for unusual knowledge or skill, which will do the work very rapidly and which will turn out a product which will be uniform instead of there being variations in the dimensions of the recesses as frequently occurs in the case of hand cutting.

An additional object is to provide a plunging machine of this variety which will be simple and inexpensive to make and assemble, easy to operate, positive in action, efficient and durable in service, and a general improvement in the art.

To the attainment of the foregoing and other objects and advantages, the invention preferably consists in the details of construction and the arrangement and combination of parts to be hereinafter more fully described and claimed, and illustrated in the accompanying drawings in which:

Figure 1 is a side elevation of a machine constructed in accordance with my invention, Figure 2 is a front elevation thereof, Figure 3 is a fragmentary vertical sectional view taken through the mechanism for effecting longitudinal or reciprocatory movement of the plunging means, Figure 4 is a detail section taken on the line 4—4 of Figure 3.

Referring more particularly to the drawings, I have shown the device as comprising an appropriate supporting frame here represented as including uprights 10 rising from a suitable base structure 11 and connected at intervals by cross bars 12. As a matter of fact the details of construction of the frame are not material as it is obvious that it might be made as a single casting or as a plurality of parts secured together. In the present instance the lower portion of the machine is represented as mounted within a pit 13 but it is equally apparent that such is not necessary as it could all be disposed above the floor level if preferred. The stationary part of the apparatus further includes forwardly extending or laterally arranged angle bars 14 supported by depending legs 15 which are in turn connected by other bars 16. The forwardly extending angle bars 14 are for the purpose of supporting the work holder which will be described hereinafter.

Journaled in bearings 17 appropriately mounted at the top and bottom of the frame are shafts 18 carrying pulleys 19 about which is trained a belt 20. One of the shafts 18 is extended and carries a drive pulley 21 engaged by a drive belt 22 which receives its power from any preferred or convenient source. Slidably and rotatably engaged through bearings 23 carried by brackets 24 forming part of the frame are vertically arranged axially alined spindles 25 which have their adjacent ends spaced considerably apart and equipped with plungers or die heads 26, the size and shape of which necessarily depends upon the contemplated or desired size and shape of the recesses to be formed in the clay piece or other object worked upon. Actually a set of die heads of different sizes and shapes might be provided for the machine, the idea being that any selected ones may be mounted upon the spindles depending upon the work to be done. Splined upon the spindles 25 are bevel gears 27 restrained against longitudinal movement with respect to the adjacent bearings 23 as by means of forks 28 secured to the brackets 24 and cooperating with grooved collars 29 carried by these gears. Meshing with the bevel gears 27 are bevel gears 30 secured upon the shafts 18. It will therefore be seen that when the pulley 21 is driven the shafts 18 will also be driven so that by virtue of the gears 30 and 27 the spindles 25 and consequently the die heads 26 will be rotated.

It is an important feature of my invention to provide mechanism for effecting movement of the die heads or plungers 26 toward and from each other at the same time and at the same speed so that they may operate simultaneously upon the object to be plunged. In carrying out this feature of the invention I provide a pair of walking beams 31 pivotally connected intermediate their ends as shown at 32 with links 33 in turn pivoted at 34 upon members 35 carried by the angle brackets 24. At one end the walking beams are forked at 36 and straddle sleeves 37 to which they are pivoted at 38. These sleeves rotatably receive the spindles 25 and are prevented from longitudinal movement with respect to the spindles by means of pairs of collars 39 on the spindles.

For effecting movement of the walking beams 31 I provide a shaft 40 journaled in suitable bearings 41, equipped with a hand wheel 42, and carrying gears 43 which mesh with other gears 44 on stub shafts 45 journaled in bearings 46. Journaled in other bearings 47 are stub shafts 48 carrying crank arms 49 having slots 50 therein within which are engaged bolts 51 passing through slots 52 in the gears 44 and also passing through the inner ends of links 53 which extend oppositely and which have their outer ends pivoted at 54 to the other ends of the walking beams 31. For making adjustments in the length of the links they may be formed of sections connected by turnbuckles 55. The bearings 46 and 47 are represented as being in alinement as are also the shafts 45 and 48 of each pair and the bearings 41, 46 and 47 are shown as formed integrally upon segment shaped plates or brackets 56 secured to the confronting sides of the uprights 10 though this is simply a mechanical detail. The purpose of the slots 50 and 52 is to make it possible to adjust the throw of the links 53 and consequently the extent of movement of the spindles 25 and die heads 26 toward or from each other, it being clear that the bolts 51 may be secured in any desired positions radially along the slots 50 and 52. It is also apparent that by means of this adjustment one spindle may be given a greater movement than the other if such is desired.

As mentioned in the objects of the invention it is the specific purpose of the machine to plunge recesses in opposite sides of a porcelain insulator while in a plastic condition. A plastic clay piece is represented at 57 as held within a form 58, usually constructed of plaster of Paris or the like. Such forms are common but in the use of my machine there must be a variation from the usual construction in that it is necessary for the form to be open at the bottom as well as the top so that the die heads 26 may have access to the clay piece. For supporting the clay piece in proper position to be acted upon by the die heads, I have shown the bars 14 as provided with guides 59 slidably receiving guide tongues 60 on the side edges of a table or shelf 61 which is apertured to receive the depending lower portion of the form 58. The slidability of this shelf or table makes it a simple matter for the operator to place in position thereon a form containing the clay piece 57, shove it into place between the die heads, and then move it back after the plunging has been effected.

In the operation, it is of course apparent that the belt 22 is driven so as to effect continual rotation of the shafts 18, gears 30 and 27 and consequently the spindles 25 and die heads 26. Normally or initially the spindles are maintained in separated position with the die heads 26 spaced apart. With the table or shelf 61 in retracted position the operator places within the opening therein the form 58 and then slides the shelf back to bring the clay piece in coaxial relation to the die heads and of course between them. The operator then turns the hand wheel 42 to rotate the gears 43 and 44 whereupon by virtue of the eccentric connection of the links 53 therewith, within the slots provided for the purpose, the links 53 will be moved away from each other, thereby rocking the walking beams 31 upon their pivots 32, the links 33 of course pivoting upon their pivots 34 so that the forward ends of the walking beams will move toward each other. This causes the sleeves 37 between the collars 39 to move the spindles 25 toward each other while they rotate. The spindles will of course engage and penetrate the opposite sides of the clay piece and form the desired recesses therein. The operator then rotates the hand wheel to effect reverse movement of the links and walking beams so that the spindles will be retracted from the clay piece, after which the form containing the clay piece is removed and set aside and replaced by another one, whereupon the cycle of operations is repeated.

From the foregoing description and a study of the drawings it will be apparent that I have thus provided a simple machine involving but a few parts and which is readily controlled and operated for the purpose of forming recesses in opposite sides of an object in plastic condition regardless of whether it be an insulator or something else. Naturally there is no restriction as to whether or not both spindles move the same distance or whatever may be the size, shape and degree of penetration of the die heads or plunger elements. Moreover they may be of different sizes in case the recesses are desired to be of different sizes. It is believed from the above that the construction, operation and advantages will be readily apparent to one skilled in the art and it is also believed that it will be clear that many changes may be resorted to in the details of construction and the arrangement and combination of parts provided such constitute no departure from the spirit of the invention or the scope of the claims hereunto appended.

Having thus described the invention, I claim:

1. A machine of the character described comprising a supporting structure, spaced alined spindles journaled therein, a transmission mechanism for imparting rotation to said spindles, plunging elements on the adjacent ends of said spindles, means for supporting between said plunging elements a plastic object to be recessed thereby, pivoted walking beams operatively connected at one end with said spindles for moving the same longitudinally, links pivotally connected with the walking beams, crank means pivotally connected with said links, and hand operated gear means for moving the crank means, and mean for adjusting said crank means to vary the throw of the links and walking beams.

2. A machine of the character described comprising a supporting structure, spaced alined spindles journaled therein, a transmission mechanism for imparting rotation to said spindles, plunging elements on the adjacent ends of said spindles, a horizontal guide having channeled sides in opposed relation, an apertured shelf having its edges slidable along said channeled sides for supporting between said plunging elements a plastic object to be recessed thereby, pivoted walking beams operatively connected at one end with said spindles for moving the same longitudinally, gears journaled on said supporting structure, said links being connected with said gears eccentrically of the latter, a shaft journaled in the supporting structure and equipped with a hand wheel, and gears on said shaft meshing with said first named gears.

3. A machine of the character described comprising a supporting structure, vertically spaced alined spindles journaled therein, means for rotating said spindles, plunging elements on the adjacent ends of said spindles, means including walking beams for moving said spindles toward or from each other, guides on the supporting structure at a point opposite the space between the plunging elements, and a shelf slidable along said guides and adapted to support an object to be engaged by said plunging elements, said shelf having an opening therein for receiving the object which projects therethrough to expose its opposite sides to the action of the plunging elements.

4. An insulator plunging machine comprising a supporting frame, vertically alined spindles journaled in said frame in spaced relation to each other, means for constantly rotating said spindles, a horizontal shaft journaled in said frame at a point intermediate the adjacent ends of the spindles, means for rotating said shaft, a pair of pinions on said shaft, a pair of countershafts journaled in said frame above and below said first named shaft, gears on said countershafts meshing with the respective pinions, another pair of shafts mounted in said frame in horizontal alinement with and in spaced end to end relation to said pair of shafts, crank arms on said last named pair of shafts, said crank arms and said gears being formed with alined radial slots, walking beams pivoted by links intermediate their ends to the frame, pitmans connected with one end of the respective walking beams and having bolt connections within the slots in said gears and crank arms, collars rotatably and non-slidably mounted cn said spindles and pivotally connected with the other ends of the respective walking beams, and a support slidably mounted on the frame at a point intermediate the adjacent ends of the spindles for supporting an object, and plunging elements on the adjacent ends of said spindles engageable simultaneously with opposite sides of the object.

5. A machine of the character described comprising a supporting structure, spaced alined spindles journaled therein, a transmission mechanism for imparting rotation to said spindles, plunging elements on the adjacent ends of said spindles, means for supporting between said plunging elements a plastic object to be recessed thereby, pivotally mounted walking beams operatively connected at one end with said spindles for sliding the same longitudinally, crank means operatively connected with said walking beams, means for driving the crank means, and means for adjusting said crank means to vary the throw of the walking beams.

STEWART L. MOORE.